(12) United States Patent  
Rodenbusch et al.

(10) Patent No.: US 7,502,460 B2  
(45) Date of Patent: *Mar. 10, 2009

(54) METHOD AND SYSTEM FOR DISTRIBUTING OUTBOUND TELEPHONE CALLS

(75) Inventors: Richard Rodenbusch, Austin, TX (US); Daniel N. Duncan, Austin, TX (US)

(73) Assignee: Austin Logistics Incorporated, Austin, TX (US)

( * ) Notice: Subject to any disclaimer, the term of this patent is extended or adjusted under 35 U.S.C. 154(b) by 250 days.

This patent is subject to a terminal disclaimer.

(21) Appl. No.: 11/758,713

(22) Filed: Jun. 6, 2007

(65) Prior Publication Data

US 2008/0118050 A1   May 22, 2008

Related U.S. Application Data

(63) Continuation of application No. 11/561,515, filed on Nov. 20, 2006, now Pat. No. 7,239,692.

(51) Int. Cl.  
*H04M 3/523* (2006.01)  
*H04Q 3/64* (2006.01)

(52) U.S. Cl. .............................. 379/266.07; 379/265.05

(58) Field of Classification Search ............ 379/265.01, 379/265.02, 265.05, 265.12, 266.01–266.05, 379/266.07, 266.08, 266.1  
See application file for complete search history.

(56) References Cited

U.S. PATENT DOCUMENTS

| | | | |
|---|---|---|---|
| 5,185,782 A | 2/1993 | Srinivasan | 379/67 |
| 5,440,585 A | 8/1995 | Partridge, III | 375/261 |
| 5,444,774 A | 8/1995 | Friedes | 379/266 |
| 5,448,555 A | 9/1995 | Bremer et al. | 270/20 |
| 5,479,487 A | 12/1995 | Hammond | 379/67 |
| 5,499,289 A | 3/1996 | Bruno et al. | 379/220 |
| 5,499,291 A | 3/1996 | Kepley | 379/265 |
| 5,509,055 A | 4/1996 | Ehrlich et al. | 379/133 |
| 5,533,108 A | 7/1996 | Harris et al. | 379/201 |
| 5,537,436 A | 7/1996 | Bottoms et al. | 375/222 |
| 5,574,781 A | 11/1996 | Blaze | 379/220 |

(Continued)

OTHER PUBLICATIONS

Declaration of Richard Rodenbusch dated Dec. 15, 2003, with attached Exhibits A-F.

(Continued)

*Primary Examiner*—Harry S Hong  
(74) *Attorney, Agent, or Firm*—Hamilton & Terrile, LLP; Robert W. Holland

(57) ABSTRACT

A method and system is provided for the distribution of outbound telephone calls. This method and system includes dialing devices receiving call records and providing telephone calls to one or more agents. Interfaced with the dialing device is a distribution module including pools and queues. The distribution module places the call records into the pools and transfers less than all of the call records to the queues to allow for calling by the dialing devices at peak efficiency. The distribution module transfers the queues to the dialing devices so that the dialing device can place telephone calls. The distribution module monitors the queues to determine when to send additional call records to the queues. In addition, distribution module monitors the results of the call records and updates the call records in the pools so that call records with unsuccessful outcomes can be safely called again later in the day.

17 Claims, 5 Drawing Sheets

U.S. PATENT DOCUMENTS

| | | | | |
|---|---|---|---|---|
| 5,661,718 | A | 8/1997 | Bremer et al. | 370/207 |
| 5,717,747 | A | 2/1998 | Boyle, III et al. | 379/201 |
| 5,721,770 | A | 2/1998 | Kohler | 379/266 |
| 5,732,218 | A | 3/1998 | Bland et al. | 395/200.54 |
| 5,740,238 | A | 4/1998 | Flockhart et al. | 379/221 |
| 5,751,795 | A | 5/1998 | Hassler et al. | 379/93.17 |
| 5,754,639 | A | 5/1998 | Flockhart et al. | 379/221 |
| 5,757,644 | A | 5/1998 | Jorgensen et al. | 364/188 |
| 5,757,904 | A | 5/1998 | Anderson | 379/265 |
| 5,825,870 | A | 10/1998 | Miloslavsky | 379/265 |
| 5,828,747 | A | 10/1998 | Fisher et al. | 379/309 |
| 5,848,143 | A | 12/1998 | Andrews et al. | 379/219 |
| 5,867,559 | A | 2/1999 | Jorgensen et al. | 379/67 |
| 5,878,130 | A | 3/1999 | Andrews et al. | 379/265 |
| 5,898,772 | A | 4/1999 | Connors et al. | 379/265 |
| 5,903,641 | A | 5/1999 | Tonisson | 379/266 |
| 5,903,877 | A | 5/1999 | Berkowitz et al. | 705/26 |
| 5,905,793 | A | 5/1999 | Flockhart et al. | 379/266 |
| 5,915,003 | A | 6/1999 | Bremer et al. | 379/93.19 |
| 5,926,539 | A | 7/1999 | Shtivelman | 379/266 |
| 5,930,337 | A | 7/1999 | Mohler | 379/88.22 |
| 5,933,476 | A | 8/1999 | Hansen et al. | 379/52 |
| 5,940,475 | A | 8/1999 | Hansen | 379/52 |
| 5,943,395 | A | 8/1999 | Hansen | 379/52 |
| 5,960,382 | A | 9/1999 | Steiner | 704/2 |
| 5,963,635 | A * | 10/1999 | Szlam et al. | 379/309 |
| 5,982,873 | A | 11/1999 | Flockhart et al. | 379/266 |
| 5,987,115 | A | 11/1999 | Petrunka et al. | 379/265 |
| 5,991,293 | A | 11/1999 | Buchanan et al. | 370/353 |
| 6,002,749 | A | 12/1999 | Hansen et al. | 379/52 |
| 6,009,162 | A | 12/1999 | Bogart et al. | 379/265 |
| 6,014,439 | A | 1/2000 | Walker et al. | 379/266 |
| 6,038,302 | A | 3/2000 | Burok et al. | 379/201 |
| 6,052,460 | A | 4/2000 | Fisher et al. | 379/266 |
| 6,061,442 | A | 5/2000 | Bhat | 379/269 |
| 6,064,730 | A | 5/2000 | Ginsberg | 379/265 |
| 6,064,731 | A | 5/2000 | Flockhart et al. | 379/265 |
| 6,070,012 | A | 5/2000 | Eitner et al. | 395/712 |
| 6,078,650 | A | 6/2000 | Hansen | 379/52 |
| 6,088,441 | A | 7/2000 | Flockhart et al. | 379/265 |
| 6,088,442 | A | 7/2000 | Chavez, Jr. et al. | 379/265 |
| 6,091,808 | A | 7/2000 | Wood et al. | 379/201 |
| 6,118,861 | A | 9/2000 | Gutzmann et al. | 379/201 |
| 6,122,364 | A | 9/2000 | Petrunka et al. | 379/265 |
| 6,163,606 | A | 12/2000 | Otto | 379/211 |
| 6,163,607 | A | 12/2000 | Bogart et al. | 379/266 |
| 6,173,053 | B1 | 1/2001 | Bogart et al. | 379/266 |
| 6,181,776 | B1 | 1/2001 | Crossley et al. | 379/34 |
| 6,188,673 | B1 | 2/2001 | Bauer et al. | 370/252 |
| 6,188,762 | B1 | 2/2001 | Shooster | 379/265 |
| 6,192,050 | B1 | 2/2001 | Stovall | 370/389 |
| 6,192,122 | B1 | 2/2001 | Flockhart et al. | 379/266 |
| 6,205,412 | B1 | 3/2001 | Barskiy et al. | 703/13 |
| 6,208,721 | B1 | 3/2001 | Feinberg et al. | 379/134 |
| 6,215,784 | B1 | 4/2001 | Petras et al. | 370/356 |
| 6,226,377 | B1 | 5/2001 | Donaghue, Jr. | 379/265 |
| 6,233,332 | B1 | 5/2001 | Anderson et al. | 379/265 |
| 6,240,391 | B1 | 5/2001 | Ball et al. | 704/270 |
| 6,256,299 | B1 | 7/2001 | Chavez, Jr. et al. | 370/329 |
| 6,256,381 | B1 | 7/2001 | Donaghue, Jr. | 379/265 |
| 6,272,216 | B1 | 8/2001 | Vaios | 379/265 |
| 6,272,544 | B1 | 8/2001 | Mullen | 709/226 |
| 6,292,550 | B1 | 9/2001 | Burritt | 379/201 |
| 6,295,353 | B1 | 9/2001 | Flockhart et al. | 379/265 |
| 6,298,127 | B1 | 10/2001 | Petrunka | 379/126 |
| 6,301,354 | B1 | 10/2001 | Walker et al. | 379/266.01 |
| 6,314,177 | B1 | 11/2001 | Davis et al. | 379/265.12 |
| 6,327,362 | B1 | 12/2001 | Hull et al. | 379/265 |
| 6,337,858 | B1 | 1/2002 | Petty et al. | 370/356 |
| 6,349,205 | B1 | 2/2002 | Fang et al. | 455/419 |
| 6,353,667 | B1 | 3/2002 | Foster et al. | 379/265.05 |
| 6,353,851 | B1 | 3/2002 | Anupam et al. | 709/204 |
| 6,356,632 | B1 | 3/2002 | Foster et al. | 379/265.04 |
| 6,359,982 | B1 | 3/2002 | Foster et al. | 379/266.06 |
| 6,366,666 | B2 | 4/2002 | Bengtson et al. | 379/265.05 |
| 6,366,668 | B1 | 4/2002 | Borst et al. | 379/266.04 |
| 6,377,944 | B1 | 4/2002 | Busey et al. | 703/3 |
| 6,385,191 | B1 | 5/2002 | Coffman et al. | 370/352 |
| 6,385,302 | B1 | 5/2002 | Antonucci et al. | 379/45 |
| 6,385,646 | B1 | 5/2002 | Brown et al. | 709/217 |
| 6,389,132 | B1 | 5/2002 | Price | 379/265.01 |
| 6,392,666 | B1 | 5/2002 | Hong et al. | 345/736 |
| 6,404,747 | B1 | 6/2002 | Berry et al. | 370/270 |
| 6,408,066 | B1 | 6/2002 | Andruska et al. | 379/265.15 |
| 6,430,174 | B1 | 8/2002 | Jennings et al. | 370/352 |
| 6,434,230 | B1 | 8/2002 | Gabriel | 379/265.01 |
| 6,445,788 | B1 | 9/2002 | Torba | 379/266.08 |
| 6,449,341 | B1 | 9/2002 | Adams et al. | 379/9 |
| 6,449,618 | B1 | 9/2002 | Blott et al. | 707/101 |
| 6,459,774 | B1 | 10/2002 | Ball et al. | 379/67.1 |
| 6,459,788 | B1 | 10/2002 | Khuc et al. | 379/265.09 |
| 6,463,346 | B1 | 10/2002 | Flockhart et al. | 700/102 |
| 6,470,077 | B1 | 10/2002 | Chan | 379/88.01 |
| 6,473,404 | B1 | 10/2002 | Kaplan et al. | 370/238 |
| 6,473,505 | B1 | 10/2002 | Khuc et al. | 379/265.01 |
| 6,477,559 | B1 | 11/2002 | Veluvali et al. | 709/101 |
| 6,480,484 | B2 | 11/2002 | Morton | 370/352 |
| 6,480,601 | B1 | 11/2002 | McLaughlin | 379/265.11 |
| 6,480,698 | B2 | 11/2002 | Ho et al. | 434/362 |
| 6,493,447 | B1 | 12/2002 | Goss et al. | 379/265.09 |
| 6,496,831 | B1 | 12/2002 | Baulier et al. | 707/101 |
| 6,498,921 | B1 | 12/2002 | Ho et al. | 434/362 |
| 6,499,023 | B1 | 12/2002 | Dong et al. | 706/46 |
| 6,501,937 | B1 | 12/2002 | Ho et al. | 434/362 |
| 6,502,133 | B1 | 12/2002 | Baulier et al. | 709/224 |
| 6,505,183 | B1 | 1/2003 | Loofbourrow et al. | 706/45 |
| 6,512,415 | B1 | 1/2003 | Katz | 329/88.22 |
| 6,526,397 | B2 | 2/2003 | Chee et al. | 701/1 |
| 6,535,601 | B1 | 3/2003 | Flockhart et al. | 379/266.01 |
| 6,539,090 | B1 | 3/2003 | Frey et al. | 379/230 |
| 6,539,538 | B1 | 3/2003 | Brewster et al. | 717/115 |
| 6,542,156 | B1 | 4/2003 | Hong et al. | 345/440 |
| 6,549,769 | B1 | 4/2003 | Harder | 455/418 |
| 6,560,330 | B2 | 5/2003 | Gabriel | 379/265.02 |
| 6,560,649 | B1 | 5/2003 | Mullen et al. | 709/226 |
| 6,563,788 | B1 | 5/2003 | Torba et al. | 370/229 |
| 6,563,916 | B1 | 5/2003 | Deutsch et al. | 379/215.01 |
| 6,563,920 | B1 | 5/2003 | Flockhart et al. | 379/265.01 |
| 6,567,787 | B1 | 5/2003 | Walker et al. | 705/16 |
| 6,570,975 | B2 | 5/2003 | Shaffer et al. | 379/220.01 |
| 6,570,976 | B2 | 5/2003 | Asada et al. | 379/221.01 |
| 6,571,240 | B1 | 5/2003 | Ho et al. | 707/5 |
| 6,574,605 | B1 | 6/2003 | Sanders et al. | 705/8 |
| 6,577,720 | B1 | 6/2003 | Sutter | 379/144.05 |
| 6,581,105 | B2 | 6/2003 | Miloslavsky et al. | 709/238 |
| 6,581,205 | B1 | 6/2003 | Cochrane et al. | 717/140 |
| 6,584,439 | B1 | 6/2003 | Geilhufe et al. | 704/270 |
| 6,587,545 | B1 | 7/2003 | Antonucci et al. | 379/37 |
| 6,587,557 | B1 | 7/2003 | Smith | 379/265.01 |
| 6,594,470 | B1 | 7/2003 | Barnes et al. | 455/67.7 |
| 7,142,662 | B2 * | 11/2006 | Rodenbusch et al. | 379/266.07 |
| 7,239,692 | B2 * | 7/2007 | Rodenbusch et al. | 379/266.07 |
| 2001/0000458 | A1 | 4/2001 | Shtivelman et al. | 370/412 |
| 2001/0021646 | A1 | 9/2001 | Antonucci et al. | 455/404 |
| 2001/0038624 | A1 | 11/2001 | Greenberg et al. | 370/352 |
| 2001/0040887 | A1 | 11/2001 | Shtivelman et al. | 370/352 |
| 2002/0010645 | A1 | 1/2002 | Hagen et al. | 705/26 |
| 2002/0073155 | A1 | 6/2002 | Anupam et al. | 709/205 |
| 2002/0101854 | A1 | 8/2002 | Siegrist et al. | 370/352 |
| 2002/0101866 | A1 | 8/2002 | Miloslavsky et al. | 370/386 |
| 2002/0131399 | A1 | 9/2002 | Philonenko | 370/351 |
| 2002/0141561 | A1 | 10/2002 | Duncan et al. | 379/220.01 |
| 2002/0169834 | A1 | 11/2002 | Miloslavsky et al. | 709/206 |
| 2002/0183072 | A1 | 12/2002 | Steinbach et al. | 455/456 |

| | | | | | | |
|---|---|---|---|---|---|---|
| 2002/0194047 A1 | 12/2002 | Edinger et al. ................. 705/9 | | 2003/0088660 A1 | 5/2003 | Florman et al. ............. 709/223 |
| 2002/0194272 A1 | 12/2002 | Zhu .......................... 709/204 | | 2003/0099342 A1 | 5/2003 | Tiliks et al. ............. 379/216.01 |
| 2002/0196277 A1 | 12/2002 | Bushey et al. ............... 345/745 | | 2003/0115353 A1 | 6/2003 | Derygin et al. ............. 709/231 |
| 2003/0001625 A1 | 1/2003 | Jaussi et al. ................... 327/65 | | 2003/0115545 A1 | 6/2003 | Hull et al. ................... 715/500 |
| 2003/0002654 A1 | 1/2003 | Torba ................... 379/266.08 | | 2003/0120395 A1 | 6/2003 | Kacel ........................... 701/1 |
| 2003/0007612 A1 | 1/2003 | Garcia ..................... 379/88.18 | | | | |
| 2003/0007625 A1 | 1/2003 | Pines et al. ................. 379/223 | | | | |
| 2003/0013438 A1 | 1/2003 | Darby ........................ 455/419 | | | | |
| 2003/0021259 A1 | 1/2003 | Miloslavsky et al. ........ 370/352 | | | | |
| 2003/0026409 A1 | 2/2003 | Bushey et al. .......... 379/211.02 | | | | |
| 2003/0033382 A1 | 2/2003 | Bogolea et al. ............. 709/218 | | | | |

OTHER PUBLICATIONS

Declaration of Thomas Miller dated Dec. 22, 2003, with attached Exhibits A-B.

* cited by examiner

METHOD AND SYSTEM FOR DISTRIBUTING OUTBOUND TELEPHONE CALLS

RELATED PATENT APPLICATION

This application claims the benefit of U.S. Provisional Application No. 60/217,292 filed on Jul. 11, 2000 and entitled "Method and System for Distributing Outbound Telephone Calls."

This application is a continuation of application Ser. No. 11/561,515, filed on Nov. 20, 2006 now U.S. Pat. No. 7,239,692 entitled "Method and System for Distributing Outbound Telephone Calls" and naming Richard Rodenbusch and Daniel N. Duncan as inventors.

TECHNICAL FIELD OF THE INVENTION

This invention relates to the field of telephony and computer networks, and more particularly to a system and method for distributing outbound telephone calls.

BACKGROUND OF THE INVENTION

Telephone call centers represent the front line for customer service, marketing operations, and debt collection for many businesses. Typical call centers receive or make hundreds of telephone calls per day with the aid of automated telephony equipment. For instance, predictive dialers such as the MOSAIX Predictive Dialing System ("PDS") manufactured by Avaya Incorporated automatically dial outbound telephone calls to contact individuals and then transfer the contacted individuals to agents so the agent can talk with the individual.

Dialing devices such as predictive dialers save time for the agent placing the call because the dialing device and not the agent dials the telephone number and agents' time is not wasted with unanswered calls or answering machines. Predictive dialers also spread the outbound telephone calls evenly among all the agents working from the dialing device so that the agents share the workload equally and no agents sit idle while others have too many telephone calls to place.

Many businesses are increasing their marketing efforts, customer service programs, and bad debt collection efforts by having multiple telephone call centers or multiple dialing devices located at a single call center to serve more customers. Typically, when businesses have multiple call centers, the call centers are located in different geographic locations which makes coordination of dialing strategies difficult.

Thus businesses generally manage call centers individually, with separate staffing, calling strategies, goals, and functions. Generally, a calling list is divided into as many parts as there are call centers or dialers with each call center receiving its own section of the calling list. Although this segmentation distributes work, coordination of strategy for outbound calling is difficult since each call center is responsible for its own section of the calling list and has no knowledge of the other call centers' progression with their own calling lists. For instance, if a call center goes down and cannot make outbound telephone calls, the other call centers cannot typically address the downed call center's calling list goals and priorities because the other call centers do not have access to the calling list including the telephone numbers actually called.

A similar problem occurs with a single call center having multiple dialers. Calling list segmentation typically occurs at a host level, where each dialing device is assigned a portion of the calling list. A host downloads the segmented calling list to the individual dialing devices. If one dialing device fails, the other dialing devices do not know the status of telephone numbers in the failed dialing device's segment.

Another difficulty associated with multiple call centers or single call centers with multiple dialing devices is inefficient use of dialing devices due to small lists of call records. Dialing devices function most efficiently when processing large volumes of accounts in call records and utilizing a certain number of agents. However, accounts are often logically grouped into smaller groups so that the dialing devices are not at an optimal performance level.

SUMMARY OF THE INVENTION

Therefore, a need has arisen for a system and method which coordinates outbound call attempts between plural dialing devices.

A further need has arisen for a system and method which transfers call records seamlessly between multiple call centers and dialing devices located within a single call center.

A further need has arisen for a system and method which efficiently operates plural dialing devices with sets of generally small accounts of call records.

In accordance with the present invention, a system and method for distributing outbound call records is provided which substantially eliminates or reduces disadvantages and problems associated with previously developed systems and methods for distributing outbound telephone calls. A distribution module distributes outbound calls for processing by one or more than one dialing device to level the call load across the dialing devices by transferring call records and tracking call attempt results for the dialing devices on a real-time basis.

More specifically, distribution of outbound call attempts between plural dialing devices is accomplished by a distribution module interfaced with the dialing devices. The distribution module controls the flow of call records to the dialing devices, arranges the call records so as to determine the order the dialing devices provide telephone calls to the agents, and monitors the call attempts of the dialing devices.

In one embodiment, the dialing device transfers call records to the distribution module. The distribution module organizes the call records into a plurality of pools. The distribution module transfers less than all of the call records from the pools to a plurality of queues. The distribution module transfers the queues containing the call records to the dialing devices after each queue has been assigned to a specific dialing device. The queues contain enough call records to ensure that the dialing devices operate at peak efficiency. As the dialing device calls the call records in the queues, the distribution module transfers additional call records from the pools to the queues.

The distribution module monitors the calling status of the queues as a calling campaign to determine when to transfer additional call records to the queues. The distribution module spreads out the calling load among the plural dialing devices and enables the dialing devices to reattempt call records where the first call was unsuccessful without risk of reattempting successful contacts.

The present invention provides a number of important technical advantages. One important technical advantage is the coordination of outbound call records to plural dialing devices that are co-located or located in geographically distributed call centers. This allows a business to optimize calling resources with a unified strategy.

Another important technical advantage of the present invention is that call records and call attempt results are coordinated through the distribution module. Therefore, unsuccessful call attempts are available for redistribution without stopping the current calling campaign so that later in the day the same or a different dialing device can attempt to call the same call record.

Another important technical advantage of the present invention is that it allows for seamless transfers of call records between multiple dialing devices. If one of the dialing devices has a problem, the distribution module transfers call records from that dialing device to one or more other dialing devices. Seamless transfers also improve efficiency where dialing devices operate at different rates. Call records are simply transferred to the dialing device having greater capacity. Thus, the ability to seamlessly transfer call records among the dialing devices improves productivity, list penetration, and call results.

Another important technical advantage of the present invention is that it allows the leveraging of resources across multiple dialing devices. The distribution module monitors and manages calling campaigns across the entire enterprise of dialing devices. The distribution module adjusts to many different calling situations and dynamically assigns work on an as-needed basis without stopping the calling campaign. Based on call attempt results, time of day, prior call results, or user input, the distribution module can take an active set of accounts and change the call order of the call records without shutting down the dialing devices or starting a new job.

Another important technical advantage of the present invention is that it allows for a dialing device to efficiently operate on small groups of calling records. The system and method allows a business to take small groups of accounts and pool them together to create a larger calling campaign on the dialing devices. Therefore, the dialing device remains active and efficient.

Another technical advantage of the present invention is that is allows skill-based routing of call records. This allows for the efficient use of constrained resources across call centers. The system can be configured to route call records to the agents most likely to generate a favorable outcome to the call while ensuring that all agents have sufficient calls to work efficiently.

BRIEF DESCRIPTION OF THE DRAWINGS

For a more complete understanding of the present invention and the advantages thereof, reference is now made to the following description taken in conjunction with the accompanying drawings in which like reference numbers indicate like features, and wherein.

DETAILED DESCRIPTION OF THE INVENTION

Preferred embodiments of the present invention are illustrated in the figures, like numeral being used to refer like and corresponding parts of the various drawings.

Under previous systems and methods for distributing outbound telephone calls, the redistribution of call records among the dialing devices or the changing of the call order of the call records required the shutting down of the dialing devices or starting a new job on the dialing device. The present invention allows the management of call records across one or more than one dialing device which allows for the leveraging of resources across multiple dialing devices. The enterprise management allows for dynamically reindexing or changing the order of the call records on an as-needed basis, changing the composition of call records within the pools, and redistribution of unsuccessful call attempts without having to shut down the dialing devices or start a new job on the dialing device.

Figure 1:
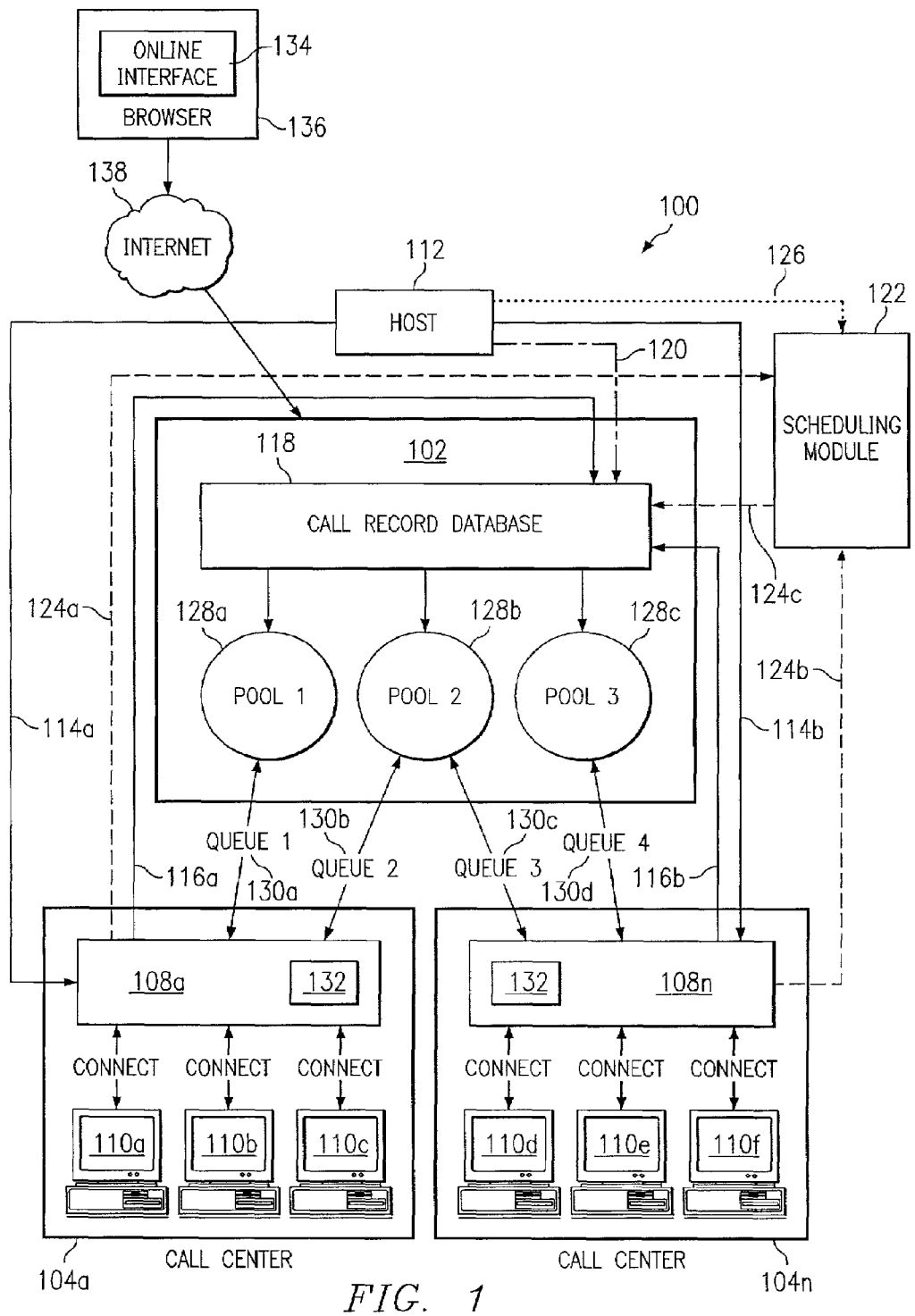
FIG. 1 depicts a block diagram of plural dialing devices interfaced with a distribution module.

FIG. 1 depicts a block diagram for an outbound distribution system 100 for distributing outbound telephone calls. A distribution module 102 interfaces with a first call center 104a and a second call center 104n. System 100 allows call centers 104a and 104n to operate as a single group of resources rather than two decentralized units, with distribution module 102 controlling the strategy, workload, and calling efforts for call centers 104 from a single, central location. In alternative embodiments, distribution module 102 interfaces with multiple dialing devices at one or more call centers, or one dialing device located in one call center.

Call centers 104 are geographically distributed, each having one or more dialing devices that place telephone calls using information in the call records. Distribution module 102 operates on a SOLARIS, Linux, or an any other appropriate operating system server and communicates with call centers 104 via standardized communications links such as Ethernet, the Internet with protocols such as FTP, CORBA, API, and sockets over TCP/IP, asynchronous transfer mode ("ATM"), or any other appropriate communication link.

Call centers 104 each have one or more dialing devices 108. Dialing devices 108 are predictive dialers such as the MOSAIX PDS manufactured by Avaya Incorporated or other appropriate predictive dialers. In the embodiment shown in FIG. 1, interfaced to dialing device 108a in call center 104a are three agents 110a, 110b, and 110c with dialing device 108n of call center 104n also having three agents 110d, 110e, and 110f interfaced to it. Agents 110 are workstations where operators or agents speak to the individuals whose telephone numbers are called by dialing devices 108.

Dialing device 108 dials telephone numbers extracted from the call records. If an individual answers the telephone, dialing device 108 transfers the telephone call to one of agents 110 so that the agent can speak with the individual. Dialing devices 108 therefore improve telephone calling efficiency by dialing the telephone number and transferring the call to an agent only if an individual answers the telephone.

System 100 functions by first having distribution module 102 acquire the call records that dialing devices 108 will call. There are several different ways that distribution module 102 acquires the call records.

For instance, host 112, which is associated with dialing devices 108, stores raw call records. The raw call records contain information including telephone number, account number, individual name and address, and any other appropriate personal information. For example, a raw call record for Joe Smith includes Joe Smith's telephone number, mailing address, account status, account number, account passwords, gender, marital status, number of children, employment status, and yearly income.

Host 112 transfers the raw call records for that day along path 114a to call center 104a and dialing device 108a and along path 114b to call center 104n and dialing device 108n. Distribution module 102 contacts dialing device 108a within call center 104a via path 116a and dialing device 108n within call center 104n via path 116b. Distribution module 102 downloads from dialing devices 108 to call record database 118 the call records. The call records may contain some but not all of the information from the raw call records. Downloading less than all of the information from the raw call records saves bandwidth and allows for efficient operation of distribution module 102 because it handles smaller amounts of data. For instance, distribution module 102 downloads as the call record an individual's name, telephone number, and account number. So the call record for Joe Smith contains Joe Smith's name, his telephone number, and account number.

In an alternative embodiment, host 112 stores the raw call records. Instead of transferring the raw call records to dialing devices 108, distribution module 102 downloads the call records from host 112 to call record database 118 via path 120.

Alternatively, dialing devices 108 store the raw call records. Therefore, distribution module 102 contacts call center 104a and dialing device 108a via path 116a and call center 104n and dialing device 108n via path 116b to download the call records to call record database 118.

Scheduling module 122 operates to develop and provide optimal calling strategies for the call records including resource optimization, automated statistical modeling and flexible strategy management. For instance, one such scheduling module 122 is described in U.S. Pat. No. 5,802,161, entitled "Method and System for Optimized Scheduling" issued Sep. 1, 1998, and is hereby incorporated by reference.

The integration of scheduling module 122 is not required for the operation of distribution module 102 but it affects how distribution module 102 downloads the call records and what information is contained in the call records. For instance, host 112 transfers the raw call records to call center 104a and dialing device 108a via path 114a and call center 104n and dialing device 108n via path 114b. Scheduling module 122 downloads from dialing device 108a in call center 104a via path 124a and from dialing device 108n in call center 104n via path 124b the raw call records. Scheduling module 122 develops call schedules for the raw call records. Distribution module 102 downloads the call records including the call schedule from scheduling module 122 via path 124c and stores the call records in call record database 118.

Alternative embodiments also employ scheduling module 122 in the delivery of call records to distribution module 102. Scheduling module 122 downloads the raw call records from host 112 via path 126. As before, scheduling module 122 adds call schedules to the raw call records before distribution module 102 downloads the call records from scheduling module 122 via path 124c to call record database 118.

Once distribution module 102 stores the call records in call record database 118, distribution module 102 organizes and transfers the call records from call record database 118 to pools 128, which are interfaced with distribution module 102. The pools are sets of callable call records specified by distribution module 102. Each pool 128 represents a specific and ordered group of call records. In the embodiment shown in FIG. 1, there are three pools 128a, 128b, and 128c. In alternative embodiments there can be more than three or less than three pools.

Distribution module 102 then transfers less than all of the call records from pools 128 to queues 130. Interfaced with pools 128 are queues 130a, 130b, 130c, and 130d. A queue is a set of rules for selecting call records from pools having the necessary and sufficient information describing the exact method of transferring call records to dialing devices 108 and any call records assigned to but not yet transferred to dialing devices 108 for dialing devices 108 to call. Distribution module 102 attaches each queue 130 to a particular dialing device 108 and monitors each dialing device. As necessary, distribution module 102 transfers call records from pools 128 in accordance with the configuration of queues 130 which includes selection rules, time of day, time of week, number of calls completed, and number of call records sent. Queues 130 then transfer the call records to their assigned dialing devices 108. For instance, distribution module 102 transfers call records according to the configuration of queues 130a and 130b to dialing device 108a of call center 104a and according to the configuration of queues 130c and 130d to dialing device 108n of call center 104n.

In addition, each queue 130 is associated with a single campaign for the dialing device to which it is assigned. A campaign is an outbound job calling on dialing device 108 that can receive additional call records for calling while the outbound calling job is active. Normally, a campaign on dialing device 108 continues to run until manually stopped.

Pools 128 can satisfy transfer requests for call records for one or more than one queue 130. For example, pool 128a transfers call records to queue 130a, pool 128b transfers call records to queues 130b and 130c, and pool 128c transfers call records to queue 130d. In addition, distribution module 102 can change the queues which request call records from pools 128 throughout the day and in the middle of outbound calling campaigns. For instance, if dialing device 108n located in call center 104n calls all the call records in pool 128c, then distribution module 102 can request that pools 128a and 128b transfer call records to queue 130d.

Distribution module 102 transfers the call records to pools 128, transfers less than all of the call records from pools 128 to queues 130, and transfers queues 130 to dialing devices 108 before dialing devices 108 begin their daily calling routines. At the beginning of the day, distribution module 102 transfers enough call records from pools 128 to queues 130 to allow for dialing devices 108 to place calls for fifteen, thirty, sixty minutes, or an appropriate amount of time to place calls. Distribution module 102 monitors the calls placed by dialing devices 108 as well as the number of call records remaining to be called to determine how busy dialing devices 108 are and when and how many additional call records to transfer from pools 128 to queues 130. The monitoring of queues 130 and the transferring of additional call records from pools 128 to queues 130 allows for real-time movement of call records from distribution module 102 to dialing devices 108 throughout the day. For instance, as soon as dialing device 108a is about to finish calling the call records in the campaign assigned to queue 130a, distribution module 102 transfers additional call records from pool 128a to queue 130a so that dialing device 108a maintains a steady and level flow of work.

Dialing devices 108 also track the call attempt results of every call placed by dialing devices 108. The call attempt results include whether or not a call resulted in a right party contact, a wrong party contact, no answer, or an answering machine. For example, the goal of a call record for Joe Smith is to talk with Joe Smith. If agent 110 speaks with Joe Smith, that is a right party contact and a successful call attempt result. If Joe's babysitter answers the phone and Joe is not home, that is a wrong party contact and an unsuccessful call attempt result. If no one answers the phone or an answering machine answers the phone, that is an unsuccessful call attempt result since the desired party was not contacted. Therefore throughout the day, distribution module 102 queries dialing devices 108 for call attempt results and uploads the call attempts results. If a call attempt result is unsuccessful, then distribution module 102 updates the call record in pools 128 so that a dialing device 108 may call the call record again at a later time in the day.

An advantage to system 100 is that distribution module 102 controls the transfer of the call records which results in a level work flow for dialing devices 108. To enable better work flow control, queues 130 include selection rules that determine how distribution module 102 transfers call records from pools 128 to queues 130. The selection rules include priority rules and percentage rules which can be modified on an as needed basis.

Priority rules result in distribution module 102 transferring call records from pools 128 to queues 130 based upon an assigned priority for each pool 128. For example, queue 130*a* receives call records from pools 128*a* and 128*b* with pool 128*a* having priority over pool 128*b*. Queue 130*b* receives call records from pools 128*a* and 128*b* with pool 128*b* having priority over pool 128*a*. Assume that pool 128*a* arrives at 8:00 AM while pool 128*b* arrives at 9:00 AM. Initially, both queues 130*a* and 130*b* receive call records from pool 128*a*. At 9:00 AM when pool 128*b* arrives, queue 130*a* continues to receive call records from pool 128*a* while queue 130*b* receives call records from pool 128*b*.

Percentage rules result in distribution module 102 simultaneously transferring call records from pools 128 to queues 130. For example, queue 130*c* has a percentage configuration with pools 128*b* and 128*c* and queue 130*d* has a percentage configuration with pools 128*b* and 128*c*. In this configuration, queue 130*c* and 130*d* receive call records simultaneously from pools 128*b* and 128*c*. With pool 128*b* arriving at 8:00 AM and pool 128*c* arriving at 9:00 AM, at 8:00 AM both queues 130*c* and 130*d* receive call records from pool 128*b*. At 9:00 AM, queues 130*c* and 130*d* alternatively receive call records from pools 128*b* and 128*c*. The percentages are variable for instance so that queue 130*c* receives 80% of its call records from pool 128*b* and 20% of its call records from pool 128*c* while queue 130*d* receives 60% of its call records from pool 128*b* and 40% of its call records from pool 128*c*.

The selection rules can also incorporate pool quotas which are limits set on each pool controlling a maximum activity level such as number of records transferred, number of successful call attempts, and other appropriate indicators of call record activity. When distribution module 102 transfers call records to pools 128, distribution module 102 can also set quotas on how many call records dialing devices 108 will call from pools 128. In the percentage rule example above, distribution module 102 can place a quota on pool 128*b*. When dialing devices 108 satisfy the quota for pool 128*b*, queues 130*c* and 130*d* no longer receive call records from pool 128*b* and only receive call records from pool 128*c*.

The selection rules can also be a combination of the percentage rules and the priority rules. For example, queue 130*b* receives call records from all three pools 128*a*, 128*b*, and 128*c*. Queue 130*b* receives call records from pool 128*b* until dialing device 108*a* calls all the call records in pool 128*b*. At that time, queue 130*b* then alternately receives call records from pools 128*a* and 128*c*. As with the percentage rules above, queue 130*b* can receive call records from pools 128*a* and 128*c* in any percentage breakdown. Therefore, pool 128*b* has priority over pools 128*a* and 128*c* while pools 128*a* and 128*c* transfer call records using percentage rules.

In addition, these selection rules allow for skills-based routing between pools 128. For example, distribution module 102 allows pool 128*a* to initially transfer call records to queue 130*a* and pool 128*c* to initially transfer call records to queue 130*d*. If pool 128*c* becomes depleted and has no more call records to transfer to queue 130*d*, then pool 128*a* can begin transferring call records to both queues 130*a* and 130*d*. This allows distribution module 102 to transfer call records for easy to moderate difficulty customers to the best agents while the less skilled agents work the more difficult customers. And once the easy to moderate difficulty customers call records are depleted, the best agents can begin working the more difficult customer call records.

In case of a communication, dialing device, or call center outage, system 100 employs contingency modules 132 for each dialing device 108. Contingency modules 132 are associated with dialing devices 108. Contingency modules 132 secure the call records within their respective dialing devices 108 in case of an outage. Before distribution module 102 transfers the call records to pools 128, distribution module 102 creates call record accounts for dialing devices 108, locks the call record accounts to dialing devices 108, creates a contingency download file, and stores the contingency download file in contingency modules 132. Distribution module 102 updates the contingency download file with call attempt results which prevents dialing devices 108 from calling call records already successfully called.

Users of system 100 control the functionality of distribution module 102 through a user interface. The user interface is shown as online interface 134 in FIG. 1 but can be any appropriate type of user interface. Online interface 134 is a graphical user, platform-independent, password-protected World Wide Web ("WWW") browser-based interface. Users use online interface 134 to control the settings for distribution module 102 including application of the selection rules, number of pools, and number of call records to initially transfer to the queues, generate reports, and create and modify enterprise parameters. Users access online interface 134 by using browser 136 to access Internet 138 to reach a specific web address. Once at the specific web address, the users enter the appropriate passwords to gain access to online interface 134.

Although the embodiment shown in FIG. 1 contains more than one dialing device, in alternative embodiments distribution module 102 interfaces with a single dialing device. A single dialing device interfacing with distribution module 102 allows for variable control over similar lists of call records. For instance, call records may be divided into geographies such as states or time zones. Calling can be stopped automatically by distribution module 102 when a quota is reached for a particular geography. Distribution module 102 presents the similar lists of call records for different geographies as different pools but the similar lists of call records for different geographies would represent one calling job within the single dialing device.

Figure 2:
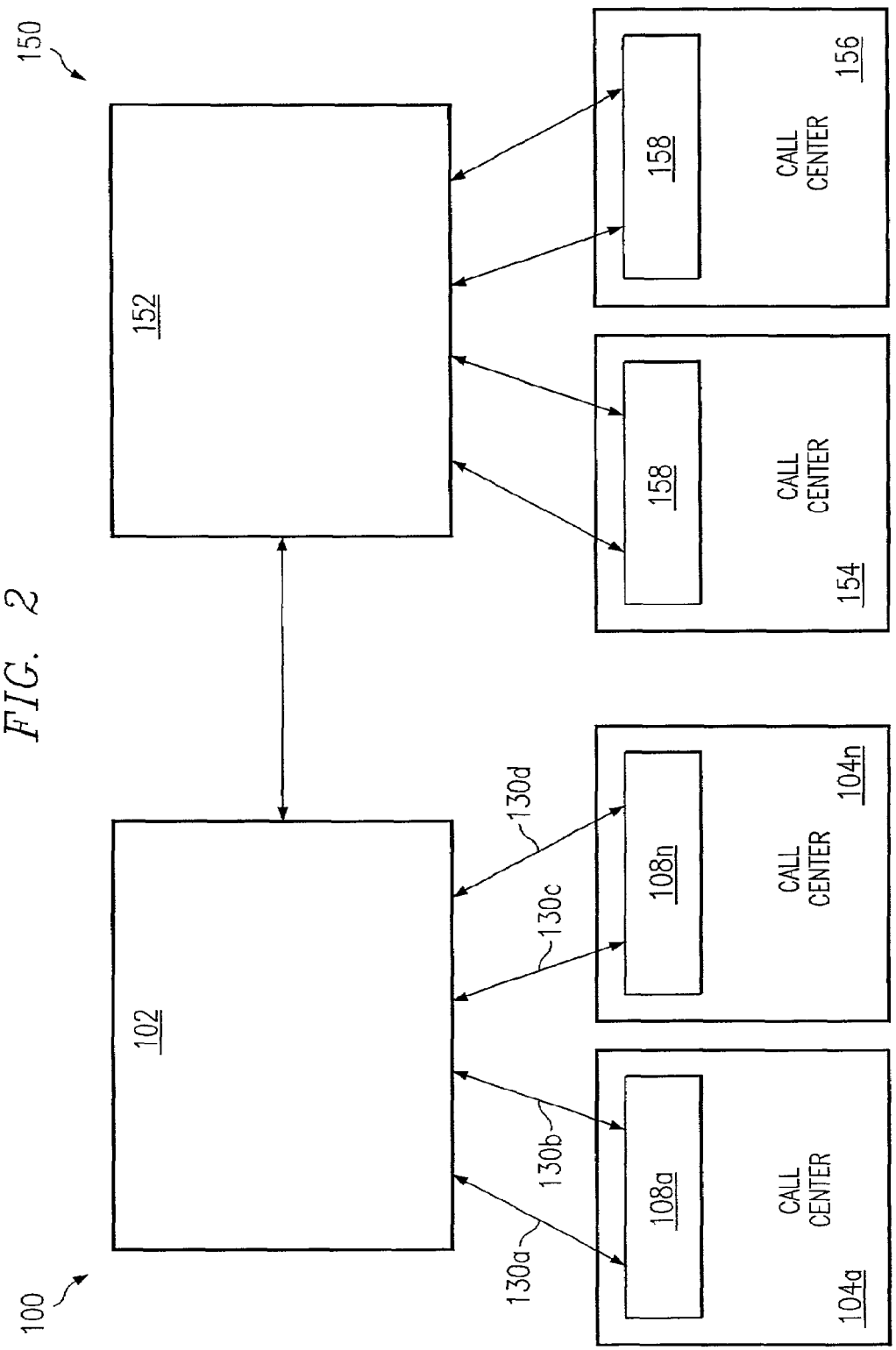
FIG. 2 illustrates a block diagram of another embodiment of the present invention employing two distribution modules.

FIG. 2 illustrates a block diagram of system 150 employing two distribution modules in an alternative embodiment of the present invention. System 100 as shown in FIG. 2 is shown with less detail than in FIG. 1.

System 150 employs two distribution modules 102 and 152. Distribution module 152 is associated with two call centers 154 and 156. Call centers 154 and 156 each have one dialing device 158. Distribution module 152 provides the same functionality to call centers 154 and 156 that distribution module 102 provides to call centers 104 as described above in the discussion regarding FIG. 1.

Distribution module 152 provides redundancy and prevents distribution module 102 from being overburdened by too many dialing devices. Distribution module 102 functions effectively with more than one dialing device interfaced with it but performance and efficiency suffers when too many dialing devices are attached. Therefore, additional distribution module 152 allows for both it and distribution module 102 to achieve optimal performance and efficiency when adding additional call centers 154 and 156 with additional dialing devices 158.

In system 150, distribution modules 102 and 152 are in communication with each other including communicating which call records are in the pools and the call attempt results.

Distribution modules 102 and 152 transfer call records and call attempt results between themselves just as distribution module 102 transfers call records and call attempt results between dialing devices 108. Therefore, if dialing devices 158 are idle while dialing devices 108 are overburdened, distribution module 102 transfers call records to distribution module 152 for dialing devices 158 to call. In addition, if distribution module 152 experiences an outage, distribution module 102 transfers the high priority calls from distribution module 152 to dialing devices 108 without worry of calling the same call record a second time in the same day when the first call resulted in a right party contact.

Figure 3:
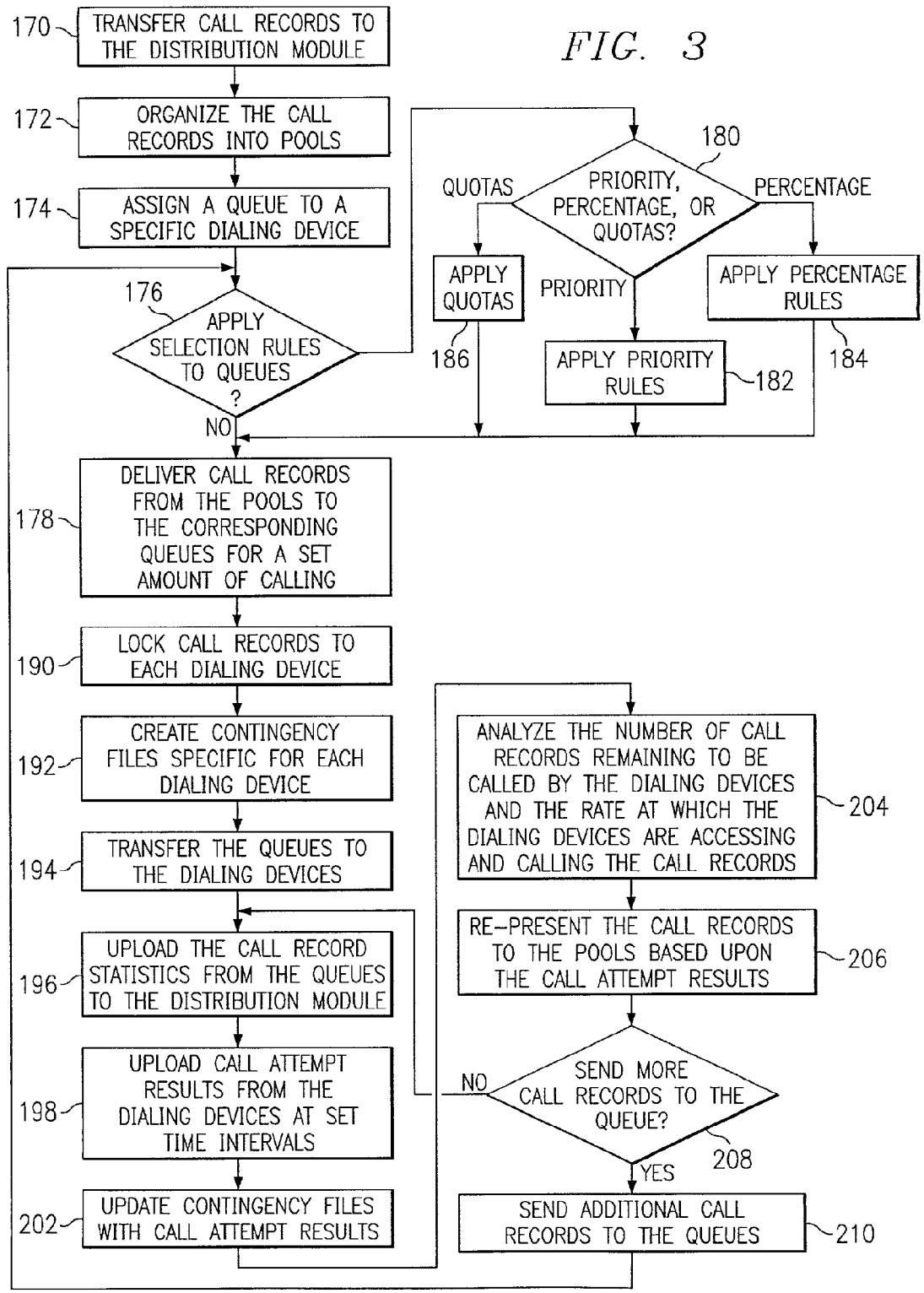
FIG. 3 depicts a flow diagram of a method for distribution outbound telephone calls.

Referring now to FIG. 3, a flow diagram depicts a process for distributing outbound call records. The process begins at step 170 with the transfer of call records from host 112, dialing devices 108, or scheduling module 122 to distribution module 102. In step 172, distribution module 102 organizes and arranges the call records into pools 128. Based upon user inputs distribution module 102 assigns queues 130 to specific dialing devices in step 174.

In step 176, distribution module 102 checks to see if the selection rules are to be applied to pools 128 and queues 130. If the selection rules are not to be applied, then the process continues in step 178. If selection rules are to be applied, then in step 180 distribution module 102 determines if priority, percentage, or quota rules are applied to pools 128. If priority rules are applied, then in step 182 distribution module 102 applies the priority rules to pools 128 and queues 130 and the process continues on to step 178. If percentage rules are applied, then in step 184 distribution module 102 applies the percentage rules to pools 128 and queues 130 and the process continues in step 178. If the quota rules are applied, then in step 186 distribution module 102 applies the quotas to pools 128 and queues 130 and the process continues to step 178.

Distribution module 102 then delivers enough call records to queues 130 for dialing devices 108 to place telephone calls for fifteen, thirty, sixty minutes, or an appropriate amount of time to place calls in step 178. In step 190, distribution module 102 locks the call records assigned to dialing devices 108 and creates a contingency file specific for each dialing device 108 in step 192.

In step 194, distribution module 102 transfers queues 130 containing the set number of call records to dialing devices 108. Every few minutes, distribution module 102 uploads call record statistics from each queue 130 in step 196. Call record statistics include such information as how many call records remain to be called and the rate at which dialing devices 108 are depleting the call records in queues 130. In addition to uploading call record statistics, in step 198 distribution module 102 also uploads call attempt results. Call attempt results include whether a right party contact or wrong party contact was made or whether an answering machine was reached when dialing devices 108 place a telephone call.

In step 202 distribution module 102 updates the contingency file with the call attempt results specific for dialing devices 108. In step 204, distribution module 102 uses the call record statistics gathered in step 196 to analyze the number of call records remaining to be called and the depletion rate of the call records within queues 130. Based upon the call attempt results, distribution module 102 re-presents to pools 128 call records where the first attempt to make a right party contact was unsuccessful so that the call record can be called later in the day in step 206. In addition, the call record can be made unavailable for the remainder of the day if a right party contact was made.

Based upon the call record statistics, distribution module 102 determines in step 208 if more call records need to be sent from pools 128 to queues 130. If more call records are needed, then in step 210 distribution module 102 sends additional call records from pools 128 to queues 130 and the process repeats beginning with step 176 until manually stopped. But if distribution module 102 determines that no additional call records need to be sent from pools 128 to queues 130 in step 208, then the process repeats beginning with step 196 until manually stopped or until there are no call records remaining to be called.

Figure 4A:
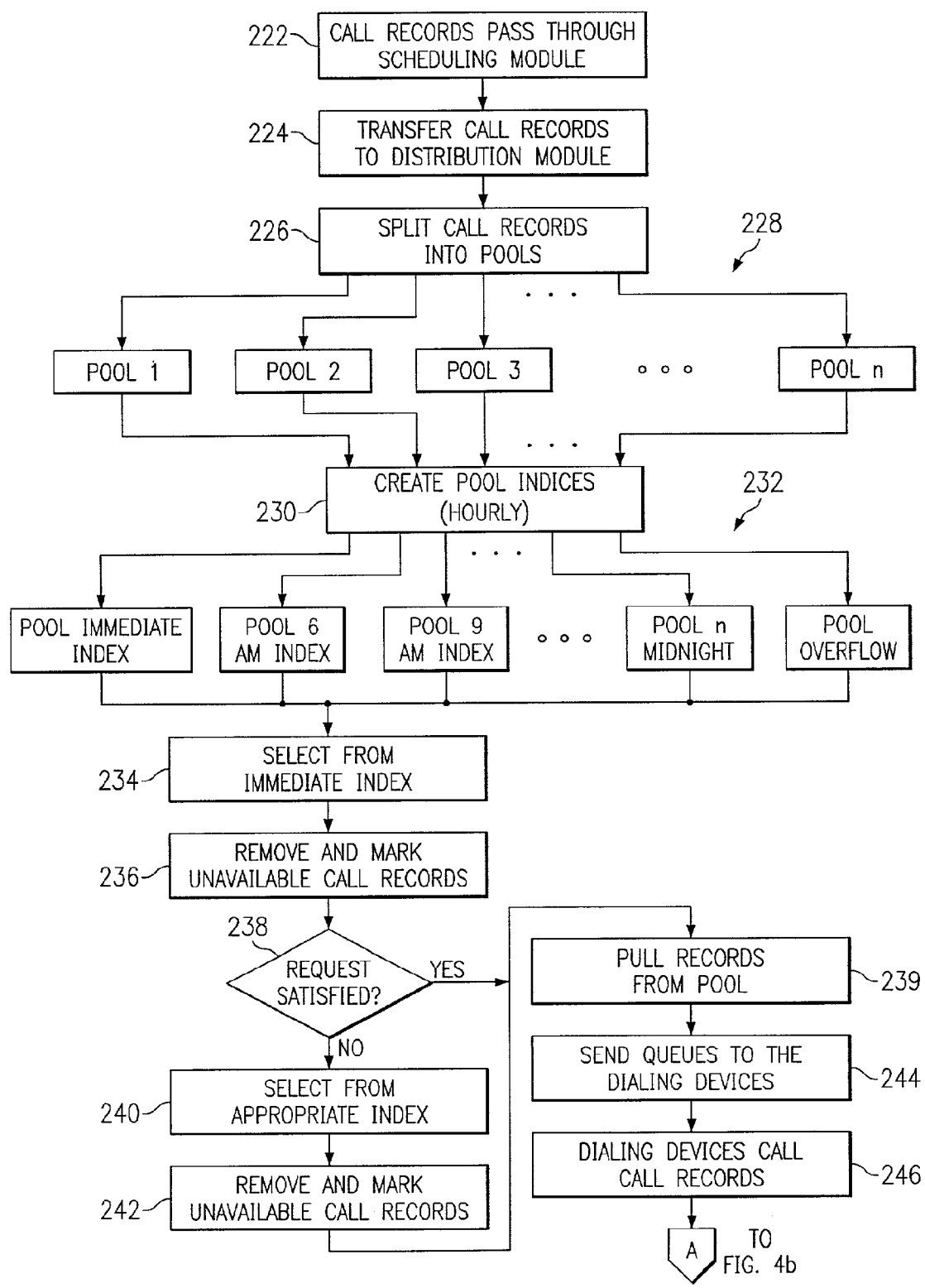
FIGS. 4a and 4b illustrate a flow diagram for the population of the pools and queues with call records.
Figure 4B:
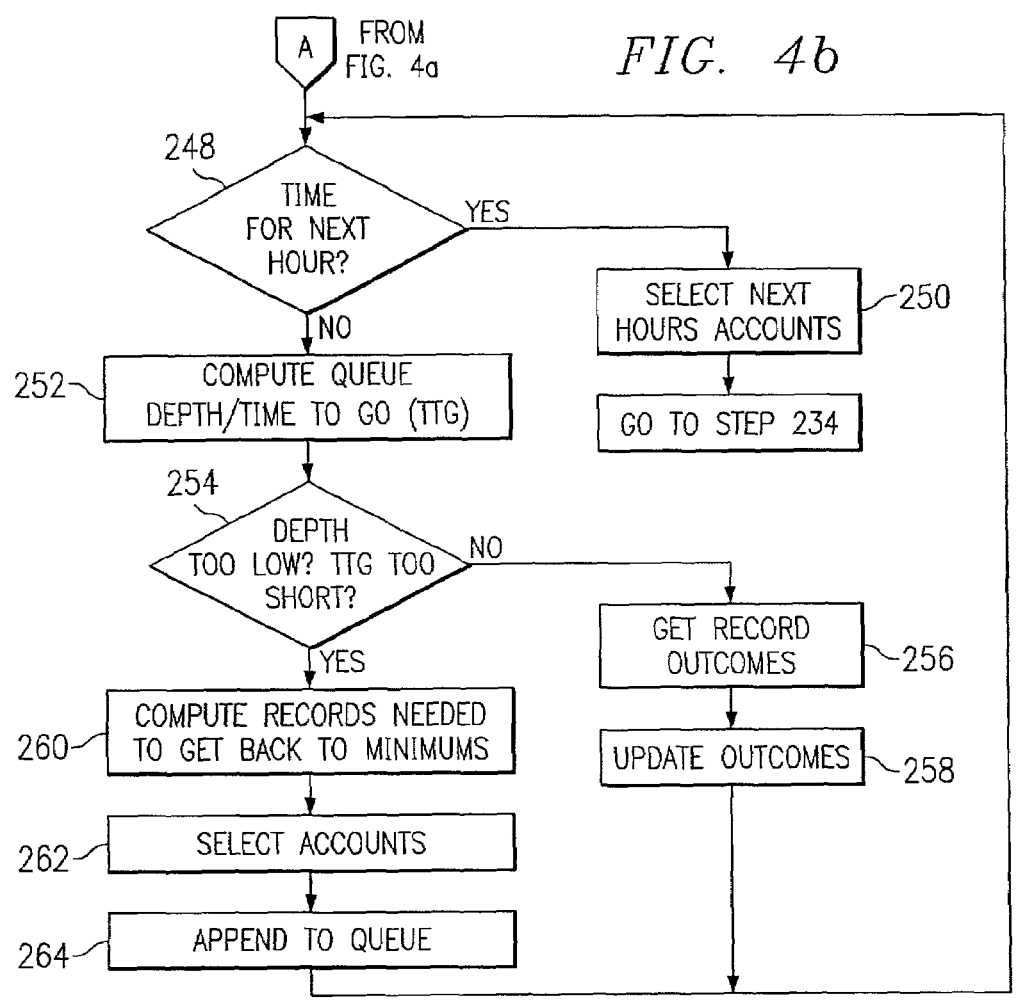

FIGS. 4a and 4b illustrate a flow diagram for the population of pools 128 and queues 130 with call records. The call records in FIGS. 4a and 4b include scheduling information provided by scheduling module 122.

Referring to FIG. 4a, In step 222 the call records pass through scheduling module 122 from either dialing devices 108 or host 112. Scheduling module 122 adds call scheduling information to each call record as it passes through it. In step 224, scheduling module 122 transfers the call records containing call scheduling information to call record database 118 within distribution module 102. Distribution module 102 then arranges the call records into pools 128 in step 226. When distribution module 102 places the call records into pools 128, distribution module 102 examines each call record to determine how to extract the scheduling information, account number and telephone number from the call record. In addition, distribution module 102 flags any call records where the scheduling information or telephone number is stripped from the end of the call record before placing it in the pools 128.

In step 228, distribution module 102 splits the call records into a plurality of pools 128. Each pool 128 holds the call record as a data string and the call records are in the same format within pools 128. In addition, distribution module 102 arranges the call records within pools 128 so that each call record is selectable by its account number.

The call scheduling information provided by scheduling module 122 allows for an optimum order to call the call records. Using the call scheduling information, distribution module 102 creates hourly indices for pools 128 in step 230. The hourly indices allow for pools 128 to take advantage of the fact that the call order and call priority of each call record changes based upon the time of day. For example, a call record might be scheduled to be the first call at 8:00 AM and if not successfully called at 8:00 AM then rescheduled to be the tenth call made at 6:00 PM. There is a hourly index created for each hour of the calling day and the hourly indices are shown in step 232. Distribution module 102 creates an index for each hour for each pool 128.

In addition to the hourly indices, distribution module 102 also creates an immediate index and an overflow index. The immediate index contains call records that are always the first to be called at the beginning of every hourly index. The call records within the immediate index allow real time call record insertion based upon previous call attempts and are often call records that resulted in no contact when called the first time. Call records contained in the overflow index are call records which were not scheduled to be called or call records that do not have call scheduling information.

Once the call records are arranged into pools 128 and the hourly indices are created, the process of transferring the call records from pools 128 to queues 130 begins. In step 234, distribution module 102 selects the call records contained in the immediate index. Distribution module 102 also removes any call records that are unavailable to be called and marks the call records as unavailable in step 236. In step 238, distribution module 102 determines if it is ready to transfer the call records from pools 128 to queues 130 for this hour and if there are a sufficient number of call records to be transferred from the immediate index to allow for fifteen, thirty, sixty minutes, or an appropriate amount of time for calling. If there are sufficient call records, then in step 239, distribution module 102 transfers the call records from the pool immediate index to queues 130.

If there are not enough call records in the immediate index, then in step 240 distribution module 102 selects call records from the appropriate hourly index. These additional call records in combination with call records from the immediate index will allow for fifteen, thirty, sixty minutes, or an appropriate amount of time for calling. In step 242, distribution module 102 removes any call records unavailable to be called and marks the call records as unavailable. Distribution module 102 then transfers the call records from the immediate index and the appropriate hourly index to queues 130 in step 239.

In step 244, distribution module 102 transfers queues 130 containing the call records to dialing devices 108. After queues 130 are transferred to dialing devices 108, in step 246 dialing devices 108 begin calling the call records.

Referring to FIG. 4b, as dialing devices 108 call the call records, distribution module 102 monitors dialing devices 108 and queues 130 for when it is time to send the next hourly index of call records from pools 128 to queues 130 in step 248. In determining when to send the next hourly index, distribution module 102 cannot start morning hour queues before the actual hour of the hourly index and must stop evening hour queues before the hourly index hour expires. For instance, the pool morning hourly index for 10:00 AM cannot be sent from pools 128 to queues 130 before 10:00 AM and the evening hourly index for 7:00 PM must stop calling at 8:00 PM. This is in part to due to telemarketing regulations that regulate the times of day that telemarketing calls may be placed.

If in step 248 it is time for the next hourly index, then in step 250 distribution module 102 selects the next hourly index to be called and begins the process of transferring the call records from the appropriate hourly index to queues 130. The process of selecting the next hourly index repeats steps 234 through 244 by first taking call records from the immediate index and adding call records from the appropriate hourly index as explained above.

If in step 248 it is not time for the next hour, then distribution module 102 determines queue depth and the time to go in step 252. Queue depth is the amount of call records remaining to be called in the queue while time to go is the amount of time remaining in the hour for the hourly index. In step 254 if the depth is not too low and the time to go is not too short so that there are a sufficient amount of call records to call for the remaining time left in the hour, then additional call records are not needed in queue 130. So in step 256, the call attempt results regarding a right or wrong party contact are uploaded from dialing devices 108 and sent back to distribution module 102 in step 258. The process then returns to step 248 to determine if it is time for the next hour.

If in step 254 distribution module 102 determines that the depth is too low or the time to go is too short, then in step 260 distribution module 102 calculates the number of call records needed to finish out the hour for the hourly index. In step 262, distribution module 102 selects additional call records to call by repeating steps 234 through 239 above and transferring the call records from the pools 128 to queues 130 in step 264 so that dialing devices 108 do not sit idle but finish out the hour placing telephone calls. The process then returns to step 248 to determine if it is time for the next hour.

Although the present invention has been described in detail, it should be understood that various changes, substitution, and alterations can be made hereto without parting from the spirit and scope of the invention as defined by the appended claims.

What is claimed is:

1. A system for distributing outbound telephone calls, the system comprising:
   one or more dialing devices, each dialing device associated with plural agents and operable to receive a plurality of call records and to provide a plurality of telephone calls to the plural agents associated with the dialing device; and
   a distribution module interfaced with at least one of the dialing devices, the distribution module having a plurality of pools and a plurality of queues, the distribution module operable to place the call records into the pools, transfer less than all of the call records from at least one of the pools to at least one of the queues, and transfer at least one of the queues to the at least one dialing device.

2. The system of claim 1 wherein the distribution module is further operable to transfer additional call records from the at least one pool to the at least one queue if the at least one dialing device has contacted predetermined of the call records.

3. The system of claim 1 wherein the distribution module comprises a server that supports TCP/IP, the distribution module transferring the queues with TCP/IP.

4. The system of claim 1 wherein the at least one dialing device comprises a predictive dialer.

5. The system of claim 1 wherein the distribution module is further operable to monitor the at least one dialing device to determine contact results associated with the call records and to transfer additional call records to the at least one queue based at least in part on the contact results.

6. The system of claim 1 wherein the distribution module is further operable to redistribute call records between plural queues based at least in part upon contact attempt results associated with the call records at the at least one dialing device.

7. The system of claim 1 further comprising a scheduling module interfaced with the distribution module, the scheduling module operable to schedule call records for ordered contact attempts by the at least one dialing device according to one or more factors.

8. The system of claim 1 wherein the distribution module manages call records in plural pools, the distribution module further operable to transfer call records to a queue from a first pool and transfers call records to the queue from a second pool when the call records in the first pool are depleted.

9. A method for distributing outbound telephone calls, the method comprising:
   transferring a plurality of call records to a distribution module;
   organizing the call records into a plurality of pools;
   transferring less than all of the call records from the pools to a plurality of queues;
   transferring at least one of the queues to at least one dialing device, the dialing device having plural associated agents; and
   dialing at the dialing device the call records of the transferred queue to connect agents associated with the dialing device to call records contacted by the dialing device.

10. The method of claim 9 further comprising:
    monitoring the results of outbound telephone calls at the dialing device;

communicating the results to the distribution module; and distributing additional call records to the at least one queue of the dialing device based in part on the results.

11. The method of claim 9 wherein organizing call records at the distribution module further comprises:

determining a priority between the call records based on one or more factors; and ordering the call records in queues based on the priority.

12. The method of claim 11 wherein the priority is based on the likelihood of a successful contact for the call record.

13. The method of claim 11 wherein the priority is based on a location associated with each call record.

14. The method of claim 9 further comprising:

uploading a plurality of call attempt results from the dialing device to the distribution module; and analyzing the call attempt results to determine the number of call records remaining to be called in the at least one queue and a depletion rate at which the dialing device calls the call records in the at least one queue.

15. The method of claim 14 further comprising:

determining a number of additional call records for the at least one queue based upon the number of call records remaining to be called and the depletion rate; and distributing the determined number of additional call records to the at least one queue.

16. The method of claim 9 further comprising redistributing the call records between plural queues based on the call attempt results associated with each of plural dialing devices.

17. The method of claim 9 wherein transferring at least one of the queues to at least one dialing device further comprises:

transferring plural queues to plural dialing devices;

locking the call records to each dialing device;

creating a plurality of contingency files specific for each dialing device; and updating the contingency files with call attempt results.

* * * * *